(12) United States Patent
Yun et al.

(10) Patent No.: US 11,314,088 B2
(45) Date of Patent: Apr. 26, 2022

(54) CAMERA-BASED MIXED REALITY GLASS APPARATUS AND MIXED REALITY DISPLAY METHOD

(71) Applicants: IMMERSIVECAST CO., LTD., Seoul (KR); Hong Seo Yun, Incheon (KR)

(72) Inventors: Hong Seo Yun, Incheon (KR); Jang Hee Han, Seongnam-si (KR)

(73) Assignees: IMMERSIVECAST CO., LTD., Seoul (KR); Hong Seo Yun, Incheon (KR)

( * ) Notice: Subject to any disclaimer, the term of this patent is extended or adjusted under 35 U.S.C. 154(b) by 0 days.

(21) Appl. No.: 17/253,107

(22) PCT Filed: Dec. 2, 2019

(86) PCT No.: PCT/KR2019/016835
§ 371 (c)(1),
(2) Date: Dec. 16, 2020

(87) PCT Pub. No.: WO2020/122488
PCT Pub. Date: Jun. 18, 2020

(65) Prior Publication Data
US 2021/0271081 A1 Sep. 2, 2021

(30) Foreign Application Priority Data
Dec. 14, 2018 (KR) .......................... 10-2018-0161697

(51) Int. Cl.
*G02B 27/01* (2006.01)
*H04N 13/344* (2018.01)
(Continued)

(52) U.S. Cl.
CPC ....... *G02B 27/017* (2013.01); *G02B 27/0093* (2013.01); *G06T 19/006* (2013.01);
(Continued)

(58) Field of Classification Search
CPC .... G02B 2027/0138; G02B 2027/0178; G02B 27/0093; G02B 27/01; G02B 27/017;
(Continued)

(56) References Cited

U.S. PATENT DOCUMENTS 8,678,282 B1 * 3/2014 Black .................... G06F 3/012
235/417
9,767,613 B1 * 9/2017 Bedikian ............ G06F 3/04845
(Continued)

FOREIGN PATENT DOCUMENTS

KR 10-2014-0133323 A 11/2014
KR 10-2016-0111904 A 9/2016
(Continued)

OTHER PUBLICATIONS

International Search Report for PCT/KR2019/016835 dated Mar. 9, 2020 from Korean Intellectual Property Office.

*Primary Examiner* — Dmitriy Bolotin
(74) *Attorney, Agent, or Firm* — Revolution IP, PLLC

(57) ABSTRACT

A camera-based mixed reality glass apparatus, includes: a smart glass unit including: a band-type flexible display disposed in an eye direction of a user, a head engaging band mounting the band-type flexible display and formed along a head of the user and a plurality of cameras mounted on an opposite direction to the eye of the user in the band-type flexible display and disposed along the head of the user, a real image processor for generating and transmitting a peripheral image of the user through the plurality of cameras, a virtual image processor for generating a direct or indirect virtual image according to a control of the user, and a mixed reality image processor for overlaying the virtual image on the peripheral image of the user and displaying the virtual image on the band-type flexible display.

10 Claims, 13 Drawing Sheets

(51) Int. Cl.
*G02B 27/00* (2006.01)
*G06T 19/00* (2011.01)

(52) U.S. Cl.
CPC ... *H04N 13/344* (2018.05); *G02B 2027/0138* (2013.01); *G02B 2027/0178* (2013.01)

(58) Field of Classification Search
CPC .. G06T 19/006; H04N 13/156; H04N 13/282; H04N 13/302; H04N 13/344
See application file for complete search history.

(56) References Cited

U.S. PATENT DOCUMENTS

| | | | |
|---|---|---|---|
| 10,180,572 B2 * | 1/2019 | Osterhout | G06F 3/011 |
| 10,559,276 B2 * | 2/2020 | Fruchter | G06F 3/011 |
| 10,706,813 B1 * | 7/2020 | Fruchter | G09G 5/397 |
| 2001/0008761 A1 * | 7/2001 | Gjerde | G01N 30/8651 |
| | | | 435/6.12 |
| 2007/0035562 A1 * | 2/2007 | Azuma | G03B 13/28 |
| | | | 345/633 |
| 2008/0024597 A1 * | 1/2008 | Yang | H04N 13/344 |
| | | | 348/53 |
| 2013/0120224 A1 * | 5/2013 | Cajigas | G09G 5/00 |
| | | | 345/8 |
| 2015/0258431 A1 * | 9/2015 | Stafford | A63F 13/5255 |
| | | | 463/31 |
| 2016/0210785 A1 | 7/2016 | Balachandreswaran et al. | |
| 2016/0379413 A1 | 12/2016 | Yamamoto et al. | |
| 2017/0252216 A1 * | 9/2017 | Maeda | H04N 13/139 |
| 2017/0363867 A1 * | 12/2017 | Poulos | G02B 27/0172 |
| 2017/0365097 A1 * | 12/2017 | Lim | G06F 3/0488 |
| 2018/0052329 A1 * | 2/2018 | Shen | G06F 3/011 |
| 2018/0116732 A1 * | 5/2018 | Lin | G06F 3/012 |
| 2018/0246331 A1 * | 8/2018 | Cheng | H04N 13/383 |
| 2018/0280656 A1 | 10/2018 | Cole et al. | |
| 2019/0089898 A1 * | 3/2019 | Kim | G06K 9/00671 |
| 2019/0213792 A1 * | 7/2019 | Jakubzak | G06F 3/017 |
| 2019/0244582 A1 * | 8/2019 | Fruchter | G06T 15/503 |
| 2019/0378280 A1 * | 12/2019 | Cho | G06T 7/246 |
| 2020/0129136 A1 * | 4/2020 | Harding | A61B 6/44 |
| 2020/0175761 A1 * | 6/2020 | Jones | G06F 3/012 |
| 2020/0275071 A1 * | 8/2020 | Zavoyskikh | G02B 27/0179 |
| 2020/0368616 A1 * | 11/2020 | Delamont | A63F 13/25 |
| 2021/0181533 A1 * | 6/2021 | Kim | G02C 7/086 |

FOREIGN PATENT DOCUMENTS

| | | |
|---|---|---|
| KR | 10-1724360 B1 | 4/2017 |
| KR | 10-2018-0000017 A | 1/2018 |

* cited by examiner

CAMERA-BASED MIXED REALITY GLASS APPARATUS AND MIXED REALITY DISPLAY METHOD

CROSS REFERENCE TO PRIOR APPLICATIONS

This application is a National Stage Application of PCT International Patent Application No. PCT/KR2019/016835 filed on Dec. 2, 2019, under 35 U.S.C. § 371, which claims priority to Korean Patent Application No. 10-2018-0161697 filed on Dec. 14, 2018, which are all hereby incorporated by reference in their entirety.

BACKGROUND OF THE DISCLOSURE

Field of the Disclosure

The present disclosure relates to a camera-based mixed reality glass apparatus, and more particularly, to a mixed reality glass apparatus and a mixed reality display method based on a camera, which is interlinked with a video repository and displays mixed reality through a smart glass attached with a plurality of cameras.

Related Art

A mixed reality (MR) includes Augmented Reality (AR), which adds virtual information based on reality, and Augmented Virtuality (AV), which adds real information to the virtual environment. That is, a user may experience a rich experience by providing a smart environment in which reality and virtual are naturally connected. As an example, a user may commune with a virtual pet placed on the palm or may play a game by constructing a virtual game environment in a room. In addition, a home furniture may be virtually constructed, or an environment may be constructed as if remote users may be gathered and work together. Generally, an implementation of the mixed reality includes four procedures of real-world recognition, virtual object generation, fusion (synthesis) of reality and virtuality and mixed image viewing. The technology used according to this procedure includes vision technology for real-world recognition, 3D modeling and authoring technology, synthesizing technology of real image and virtual image, real-time rendering technology, interface technology, and the like. The most important process for implementing the mixed reality is the synthesis of reality and virtuality, that is the process of fusing a real space and a virtual space. The process of fusing both spaces is called registration, and the key point in the registration is to minimize unnaturalness due to fusion of both spaces. Recently, as a Head Mounted Display (HMD) is provided, which shows an effect of looking like a large screen through a virtual screen having a focal point distance in front of the eye, as an apparatus wearing like an eye-glasses, technologies related to Augmented Reality (AR) or Mixed Reality (MR) as well as the conventional Virtual Reality (VR) applied to the reality are introduced by using the HMD apparatus.

Korean Patent Publication No. 10-2018-0000017 (Jan. 2, 2018) provides a method for providing augmented reality using smart glasses having a privacy protection function. A method for providing augmented reality using smart glasses according to an aspect of the present disclosure includes a first-directional photographing step in which a front is photographed by using the smart glasses, an object distinguishing step for distinguishing a person and background from a photographed picture or video image, a person correcting step for correcting a person shown in the photographed picture or video image, and a storing step for storing the corrected photograph or video image.

Korean Registered Patent No. 10-1724360 (Apr. 7, 2017) discloses a mixed reality display apparatus according to an embodiment including a virtual environment rendering unit for generating a virtual object using information of a scene in a virtual reality and generating a color image and a depth map of the virtual object, a depth rendering unit for generating a depth map for a real object using information of a real environment, an occlusion processor for executing an occlusion process using the color image and the depth map of the virtual object received from the virtual environment rendering unit, the depth map for the real object received from the depth rendering unit and the color map for the real object received from a see through camera, and a display unit for outputting a color image using the color map of the virtual object received from the occlusion processor and the color map of the real object.

PRIOR ART DOCUMENT

Patent Document

Korean Patent Publication No. 10-2018-0000017 (Jan. 2, 2018)
Korean Registered Patent No. 10-1724360 (Apr. 7, 2017)

SUMMARY OF THE DISCLOSURE

An embodiment of the present disclosure is to provide a camera-based mixed reality glass apparatus interlinked with a video repository for providing mixed reality and including a smart glass with a plurality of cameras attached thereto.

An embodiment of the present disclosure is to provide a camera-based mixed reality glass apparatus capable of generating and correcting a surrounding image through a plurality of cameras attached to a smart glass to store in a video repository and displaying the generated mixed reality by overlaying a virtual image.

An embodiment of the present disclosure is to provide a camera-based mixed reality glass apparatus interworks with a video repository to store and keeps a mixed reality image, and then a user may load a desired image and enjoy the image through time or place information, and thereby providing high immersive experience to a user.

An embodiment of the present disclosure is to provide a camera-based mixed reality glass apparatus that provides optimal focus and distance sense to a user by adjusting an angle of camera in real time in a process of providing a mixed reality image.

In one embodiment, a camera-based mixed reality glass apparatus includes a smart glass unit comprising: a band-type flexible display disposed in an eye direction of a user, a head engaging band mounting the band-type flexible display and formed along a head of the user and a plurality of cameras mounted on an opposite direction to the eye of the user in the band-type flexible display and disposed along the head of the user, a real image processor for generating and transmitting a peripheral image of the user through the plurality of cameras, a virtual image processor for generating a direct or indirect virtual image according to a control of the user, and a mixed reality image processor for overlaying the virtual image on the peripheral image of the user and displaying the virtual image on the band-type flexible display.

The smart glass unit may further include at least one camera disposed at a front side and a rear side of the head engaging band, respectively, and configured to photograph a 360-degree image of the user as the peripheral image.

The real image may include Global Positioning System (GPS) and provide information of a position and a time of the user determined through GPS together with the peripheral image of the user to a video repository through a network.

The real image processor may determine a head direction center and a height center of the user through calibration before the generation of the peripheral image, correct left and right rotational shake occurring during a movement of the user based on the head direction center and the height center, and store the peripheral image in a video repository as a 360-degree image.

The real image processor may perform an image blending with respect to a boundary region where a plurality of images is overlapped, after the plurality of images received from a plurality of cameras are mechanically image-stitched in a process of correction regarding vertical and horizontal rotational shake.

The mixed reality image processor may overlay the virtual image on a 360-degree image corrected through the image stitching and the image blending, and wherein the virtual image may include a path guide for guiding a destination of the user.

The mixed reality image processor may predict a direction of the user gaze through a brain wave of the user and display the mixed reality image in advance according to the direction of the user gaze.

In one embodiment, the camera-based mixed reality glass apparatus may further include a first camera adjusting unit configured to detect a distance from an object existing in a gaze direction of the user and adjust an angle of the plurality of cameras mechanically in real time based on the detected distance.

In one embodiment, the camera-based mixed reality glass apparatus may further include a second camera adjusting unit configured to detect a movement of a pupil of the user looking at the object and adjust an angle of the plurality of cameras mechanically based on the detected movement of the pupil.

The camera-based mixed reality glass device may store the mixed reality image together with GPS information and time information in a video repository through a network in real time, and simultaneously, share the mixed reality image by broadcasting in real time targeted to smart glasses of a plurality of users, and further, receive the mixed reality image for the GPS information and the time information from the video repository and provide it.

In one embodiment, a camera-based mixed reality glass display method may include generating a peripheral image of a user through a plurality of cameras disposed on a smart glass and storing the peripheral image as a 360-degree image in which shake is corrected through an image stitching, generating direct or indirect virtual image according to a control of the user, and displaying the virtual image by overlaying the virtual image corrected through the image stitching on the 360-degree image around the user on a band-type flexible display.

DESCRIPTION OF EXEMPLARY EMBODIMENTS

The description of the present disclosure is merely exemplary embodiments for structural and functional descriptions. This present disclosure should not be construed as limited to the embodiments set forth herein. That is, since the embodiments may have various modifications and variations, it is understood that the scope of the present disclosure includes equivalences that implement the technical concept. In addition, a specific embodiment should include all the proposed objects or effects or include only the effects, and accordingly, it should not be understood that the scope of the present disclosure is limited thereby.

Meanwhile, the terms described in the present application should be understood as follows.

The terms "first" and "second" are used to distinguish one element from another element, and the scope of the present disclosure should not be limited by these terms. For example, a first element may also be referred to as a second element, and similarly, a second element may also be referred to as a first element.

It will be understood that when an element is referred to as being "connected" to another element, it may be directly connected the other element, or it will be understood that an element may exist therebetween. However, when an element is referred to as being "directly connected" to another element, it will be understood that there is no element therebetween. Meanwhile, other expressions describing a relation between elements, that is, "between~", "directly between~", "neighboring~", "adjacent to~", and the like should be interpreted in the same way.

A singular expression should be interpreted that the singular expression includes a plural expression unless it does not mean otherwise in the context. And, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

It will be understood that, an identification code (e.g., a, b, c, etc.) is used for the convenience of description. The identification code is not intended to describe an order of steps, but the steps may occur in the same order as the specified order or may be performed substantially at the same time or may be performed in opposite order.

Unless it is contrarily defined, all terms have the same meanings as those generally understood by a person with ordinary skill in the art. Terms which are defined in a generally used dictionary should be interpreted to have the same meaning as the meaning in the context of the related art and are not interpreted as an ideal meaning or excessively formal meanings unless clearly defined in the present application.

Figure 1:
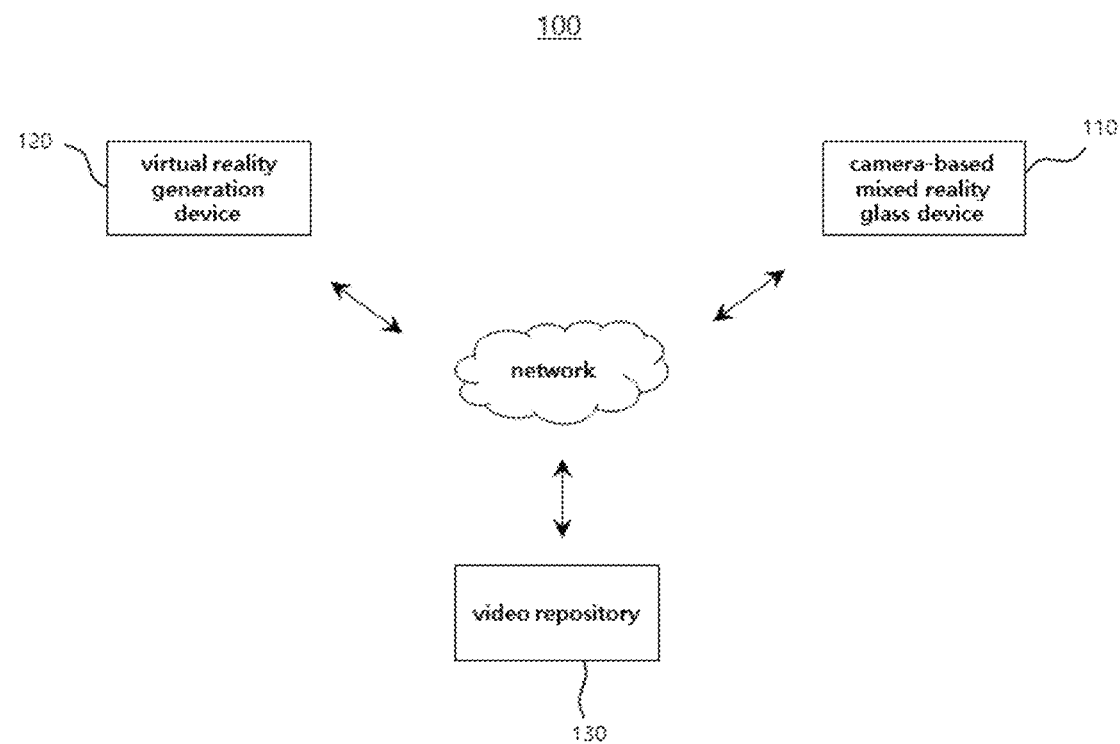
FIG. 1 is a diagram illustrating a mixed reality display system through a camera-based mixed reality glass apparatus according to an embodiment of the present disclosure.

FIG. 1 is a diagram illustrating a mixed reality display system through a camera-based mixed reality glass apparatus according to an embodiment of the present disclosure.

Referring to FIG. 1, a mixed reality display system 100 may include a camera-based mixed reality glass device 110, a virtual reality generation device 120 and a video repository 130.

The camera-based mixed reality glass device 110 corresponds to a computing device that may be connected through a network with the virtual reality generation device 120 and the video repository 130. The camera-based mixed reality glass apparatus 110 is proposed for providing a mixed reality to a user by synthesizing a real image photographed through a camera and a virtual image controlled through a user. In one embodiment, the camera-based mixed reality glass apparatus 110 may generate an actual image around the user through a camera attached to an outer surface of the smart glass, and may synthesize the real image with the virtual image from the virtual reality generation device 120, which is input controlled by the user, to the user. That is, the camera-based mixed reality glass device 110 may provide a mixed reality through a Head Mounted Display (HMD) attached to a user head. Here, the mixed reality may refer to creating new information such as a new environment or visualization by merging a virtual world with a real world. Particularly, the concept of mixed reality may be used when referring to being able to interact in real time between what is really exist and what is virtually exist.

The virtual reality generation device 120 corresponds to a computing device that may be connected to a camera-based mixed reality glass device 110 through a network. For example, a desktop, a notebook, a tablet PC, or a smartphone or a mobile set-top box may be implemented. The virtual reality generation device 120 may generate a virtual image, which is directly or indirectly controlled through the virtual reality device, to provide a camera-based mixed reality glass device 110. In one embodiment, the virtual reality generation device 120 may be connected to the video repository 130 via a wired/wireless network interface, and in this case, the user may be provided with a mixed reality image or the like stored in the video repository 130.

The camera-based mixed reality glass device 110 may be implemented by including the video repository 130 or may be implemented independently from the video repository 130. The camera-based mixed reality glass device 110 independently implemented with the video repository 130 may be connected through a network with the video repository 130 to transmit and receive image files.

The video repository 130 is a storage device capable of storing and transmitting various image information required for a mixed reality display through the camera-based mixed reality glass device 110. In one embodiment, the video repository 130 may be photographed through a plurality of cameras attached to a band-type flexible display and a head combination band and may store a real image around a corrected user, but not limited thereto, may store an indirect virtual image according to a user control. The video repositories 130 may store and keep mixed reality images photographed and generated by the camera-based mixed reality glass apparatus 110. The video repository 130 may store information collected or processed in various forms in a process of displaying a mixed reality through the camera-based mixed reality glass device 110. Furthermore, multiple users may connect to the video repository 130 using the camera-based mixed reality glass apparatus 130 to receive and consume information stored in real time or in non-real time.

Figure 2:
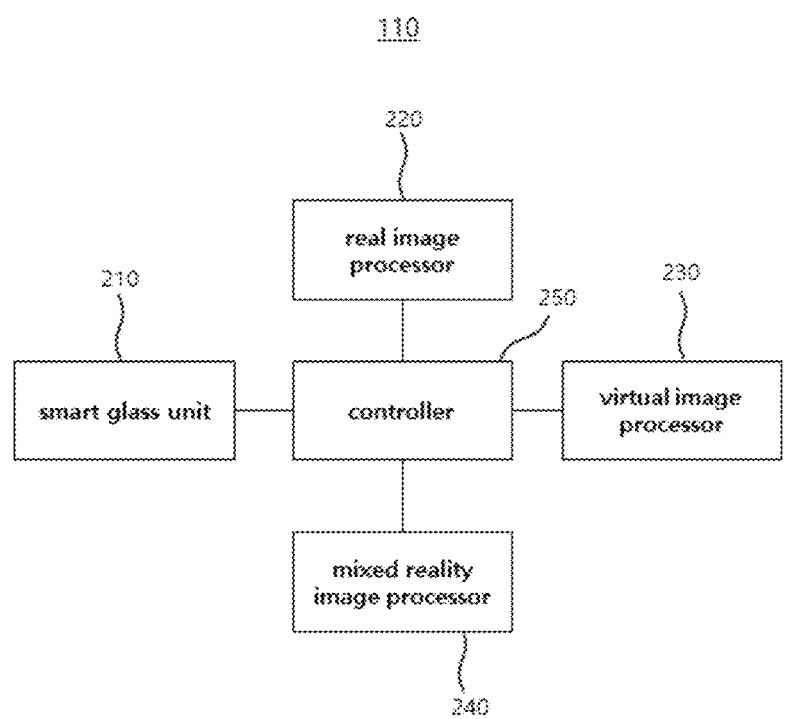
FIG. 2 is a block diagram illustrating a camera-based mixed reality glass apparatus according to an embodiment of FIG. 1.
Figure 3A:
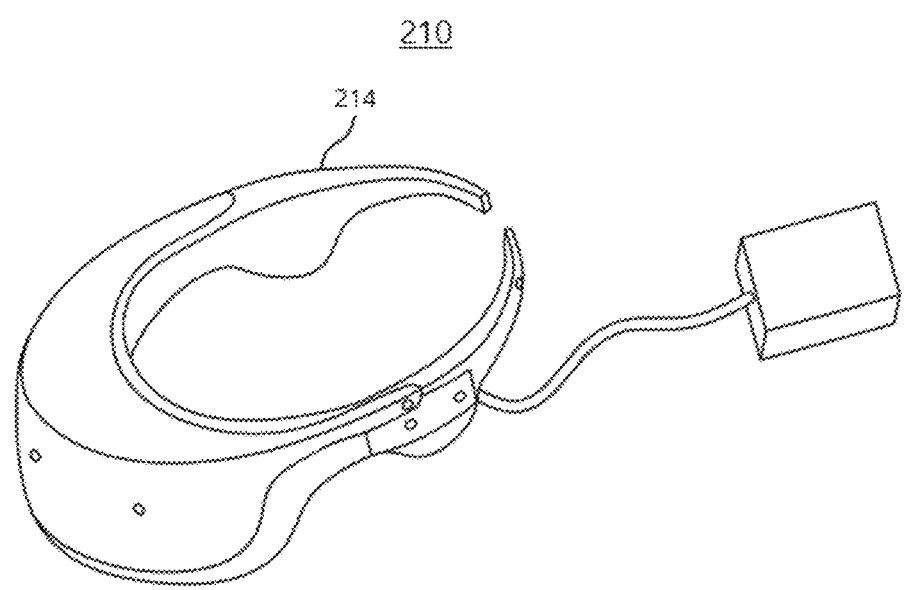
FIGS. 3A, 3B and 3C are diagrams illustrating a smart glass unit according to an embodiment of FIG. 2.
Figure 3B:
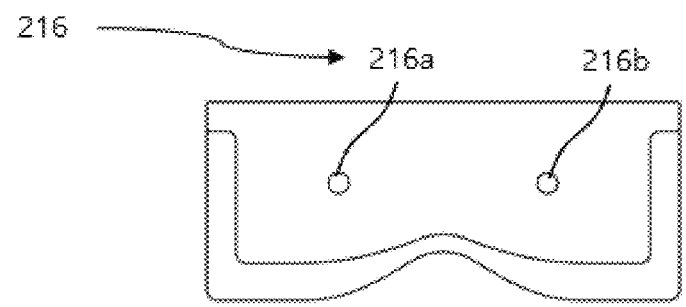
Figure 3B:
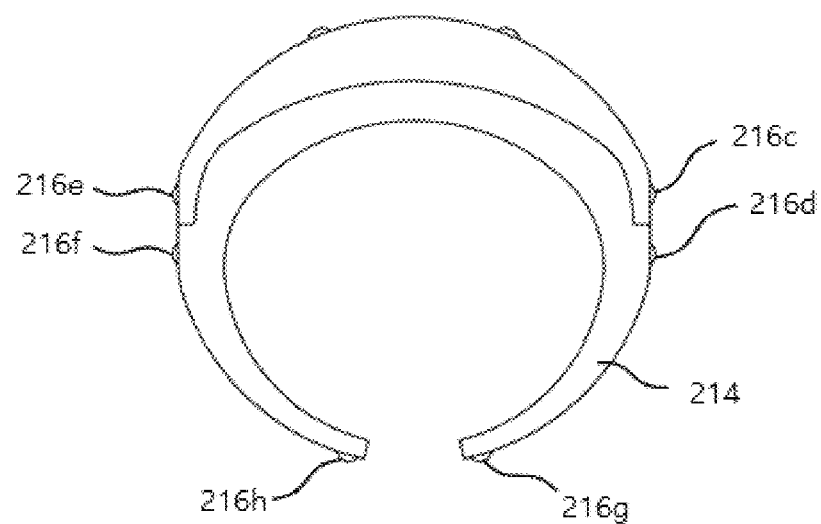
Figure 3B:
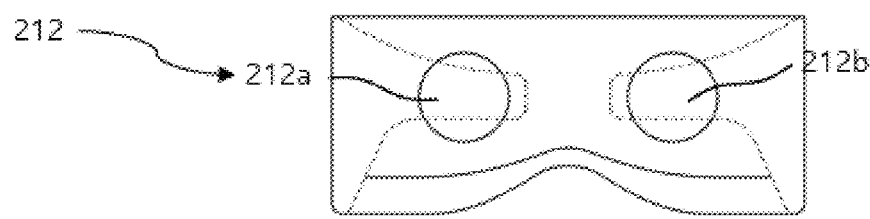
Figure 3C:
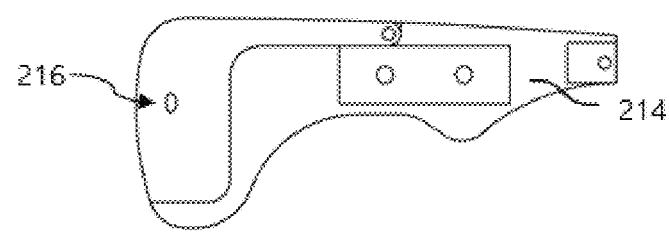
Figure 3C:
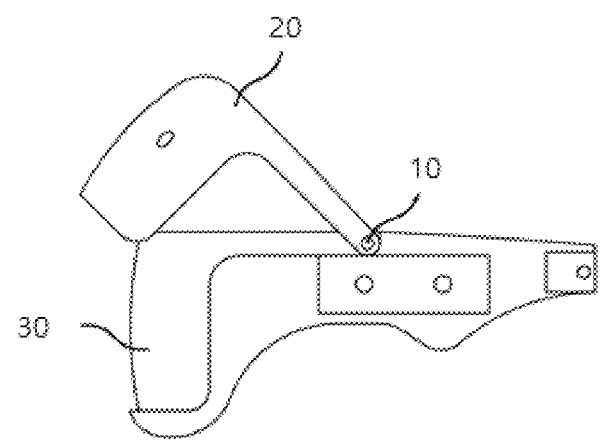
Figure 3C:
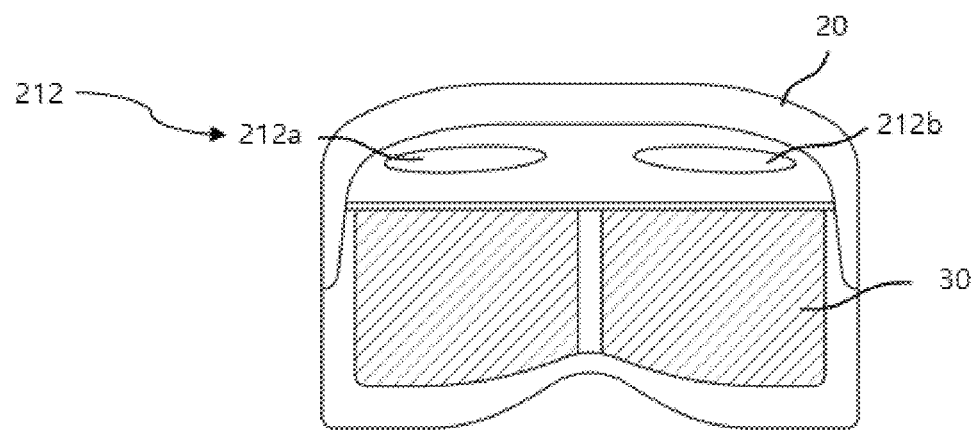

FIG. 2 Is a block diagram illustrating a camera-based mixed reality glass apparatus according to an embodiment of FIG. 1.

Referring to FIG. 2, the camera-based mixed reality glass device 110 may include a smart glass unit 210, a real image processor 220, a virtual image processor 230, a mixed reality image processor 240, and a controller 250.

The smart glass unit 210 may include a band-type flexible display disposed in an eye direction of a user, a head engaging band mounting the band-type flexible display and formed along the head of the user and a plurality of cameras mounted on an opposite direction of a user's eyes in the band-type flexible display and disposed along the head of the user. The band-type flexible display 212 may be disposed in the user eye direction to display a mixed reality image to the user. The head engaging band 214 is formed so as to be able to attach smart glasses to the head of the user. The plurality of cameras 216 may be disposed on the head engaging band 214 along the head of the user to receive a peripheral image. In one embodiment, the smart glass unit 210 may further include at least one camera 216 disposed at the front, both sides, and the rear surface of the head engaging band. More specifically, the smart glass unit 210 may include a plurality of cameras 216 around the head along the head engaging band. For example, the smart glass unit 210 may arrange the at least one camera 216 in the user's eye direction, the ear direction, and the backward direction on the head engaging band, respectively. A more detailed description will be given with reference to FIG. 3.

The real image processor 220 may generate a peripheral image of the user through the plurality of cameras 216. More specifically, the real image processor 220 may generate a 360-degree image around the user through the plurality of cameras 216. In one embodiment, the real image processor 220 may include Global Positioning System (GPS) and may provide a position of the user determined through GPS with the peripheral image of the user in the video repository 130. Here, the video repository 130 corresponds to a storage for storing various images and may be connected to the camera-based mixed reality glass device 110 through a network. More specifically, the real image processor 220 may exchange the generated peripheral image of the user with the remote video repository 130 connected through a network. In one embodiment, the real image processor 220 may correct shake of the peripheral image of the user and store the peripheral image as a 360-degree image in the video repository 130. More specifically, the real image processor 220 may determine a head direction center and a height center of the user through calibration before the generation of the peripheral image, and may correct left and right rotational shake occurring during the movement of the user based on the head direction center and the height center, and store the peripheral image in the video repository 360 as a 360-degree image. Here, the calibration may refer to measuring a focal length or iris scale of a predetermined lens and marking it when photographing a scene with a rapid change in distance between a camera and a subject or a rapid change in illumination. The real image processor 220 may correct the shake occurring in the movement process of the user based on the head direction center and the height center determined through the calibration. In one embodiment, the real image processor 220 may perform an image stitching on a plurality of corresponding images received from a plurality of cameras in the process of shake correction. Here. the image stitching may mean a process of combining a plurality of images into one image, including a process of integrating a portion in which a plurality of images photographed by a plurality of cameras is overlapped. For example, the real image processor 220 may utilize the position information of the user by GPS in the image stitching process. More specifically, the real image processor 220 may perform an image blending with respect to a boundary region where a plurality of images is overlapped, after the plurality of images received from a plurality of cameras are mechanically image-stitched in a process of correction regarding vertical and horizontal rotational shake. Here, the image blending may refer to mixing two different layers in image processing. The real image processor 220 may perform correction through calibration of a plurality of images photographed by a plurality of cameras and perform the image stitching and the image blending to generate a peripheral image.

The virtual image processor 230 may generate a direct or indirect virtual image according to a control of the user. Here, the virtual image may refer to an image of a virtual region or virtual objects around the user based on virtual reality (VR). In one embodiment, the virtual image processor 230 may receive the virtual image from the virtual reality generation device 120. More specifically, the virtual image processor 230 may receive the virtual image directly or indirectly through the virtual reality generation device 120 according to a control of the user to provide it to the camera-based mixed reality glass device 110. For example, the virtual image processor 230 may indirectly receive an image stored from the video repository 130 to generate a virtual image and may generate a virtual image from the virtual reality generation device 120 directly. The virtual image processor 230 may provide a plurality of virtual images generated directly and indirectly to the mixed reality image processor 240.

The mixed reality image processor 240 may overlay a virtual image on the peripheral image of the user to display it on the band-type flexible display. More specifically, the mixed reality image processor 240 may generate and display a mixed reality through synthesis of the real image and the virtual image. In one embodiment, the mixed reality image processor 240 may overlay the virtual image on the 360-degree image corrected through the image stitching. More specifically, the mixed reality image processor 240 may overlay a virtual image to a user peripheral image provided with 360-degree to provide a mixed reality of 360-degree to the user. In one embodiment, the mixed reality image processor 240 may overlay the virtual image by including a path guide for guiding a user's destination on a 360-degree peripheral image corrected through the image stitching and the image blending. For example, the mixed reality image processor 240 may generate and provide a path guide for guiding a preconfigured user's destination on the virtual image overlaid with the user peripheral image through GPS information of a user provided with the user peripheral image. In one embodiment, the mixed reality image processor 240 may detect a user's brain wave and generate user information. Here, the user information may correspond to a gaze direction, a pupil state, and an eye blinking of the user. More specifically, the mixed reality image processor 240 may predict the direction of the user gaze through a brain wave of the user and display the mixed reality image in advance according to the direction of the user gaze. For example, the mixed reality image processor 240 may detect a brain wave of the user to predict a gaze movement of the user and display various mixed reality images in the gaze direction of the user 0.2 to 0.5 seconds faster than the gaze of the user.

The controller 250 may control the overall operation of the camera-based mixed reality glass device 110 and may control a data flow among the real image processor 220, the virtual image processor 230, and the mixed reality image processor 240.

FIG. 3 is a diagram illustrating a smart glass unit according to an embodiment of FIG. 2.

Referring to FIG. 3, the smart glass unit 210 includes a band-type flexible display 212, a head engaging band 214, and a camera 216. FIG. 3a is a perspective view showing a smart glass of the smart glass unit 210, and FIG. 3b is a planar view showing a front surface, a top surface and a rear surface of the smart glass. FIG. 3c may correspond to a planar view showing a side surface of the smart glass and a front view when a lens cover is open.

In one embodiment, the band-type flexible display 212 may include a transparent lens and a display panel disposed in a user eye direction of the smart glass. The head engaging band 214 may be formed in the form of a head band capable of mounting the camera-based mixed reality glass device 110 on a user's head. In one embodiment, the head engaging band 214 may place a plurality of cameras 216 along the head of the user on the outer surface. The plurality of cameras 216 may be disposed in front, rear, and rear sides of the head engaging band and photograph 360-degree image of the user as a peripheral image. For example, the head engaging band 214 may arrange the plurality of cameras 216 in the direction opposite to the user's eyes, the user's ear direction, and the user's backward direction. In one embodiment, the head engaging band 214 may fold a lens cover 20 mounted with a front camera in front of the user's eyes to the body portion of the head engaging band 214. More specifically, the head engaging band 214 may open and close the lens cover 20 mounted with the front camera to the center of the head engaging band 214 about hinges 10 at both sides thereof. When the lens cover 20 is open, the user may view a periphery visually through the transparent lens 30, and when the lens cover 20 is closed, the user may view the mixed reality image in which the virtual image is overlaid on the peripheral image through the band-type flexible display 212 disposed in the user's eye direction of the lens cover 20.

Figure 4:
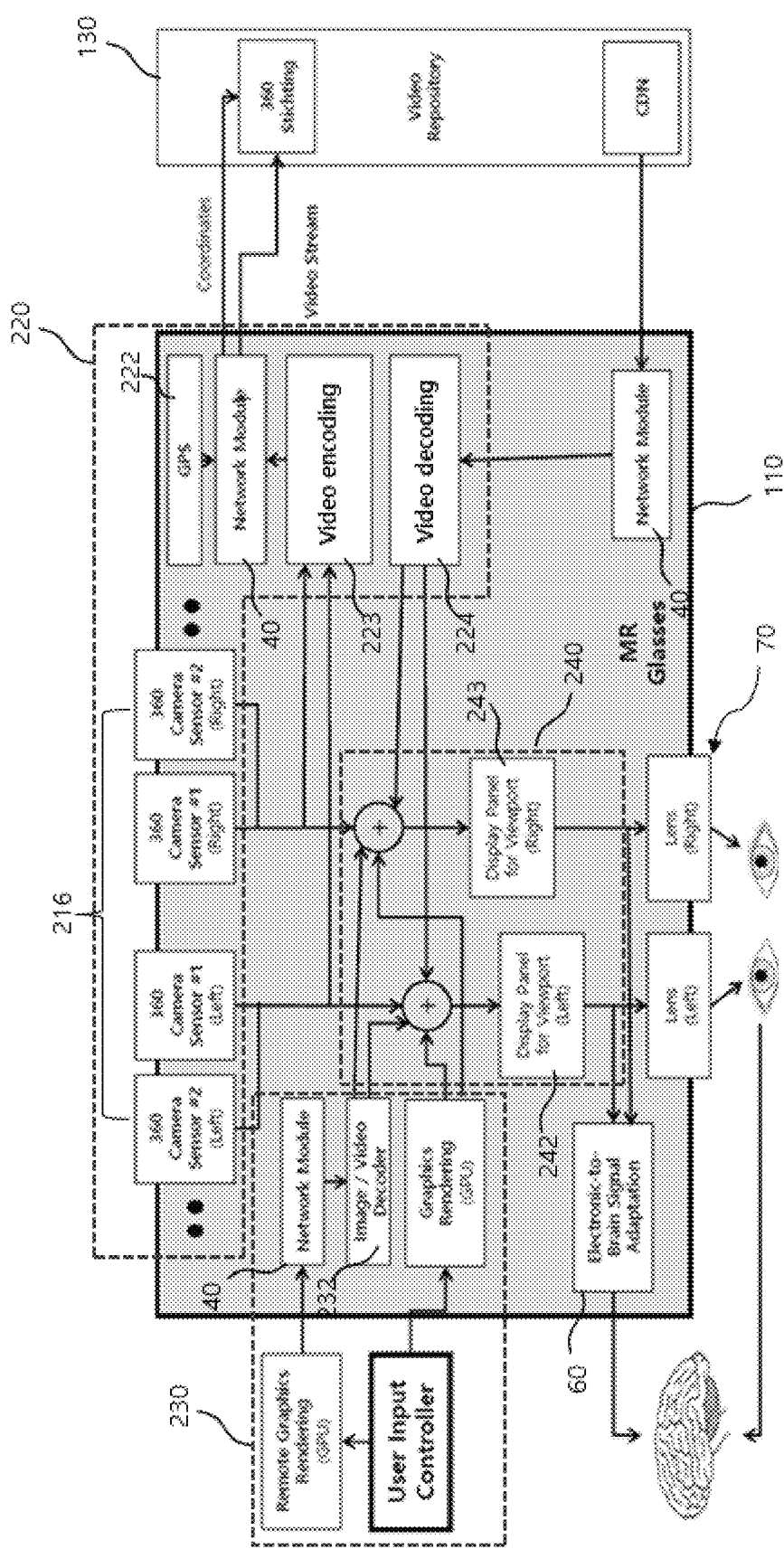
FIG. 4 is a diagram illustrating a camera-based mixed reality glass apparatus according to an embodiment.

FIG. 4 is a diagram illustrating a camera-based mixed reality glass apparatus according to an embodiment.

In FIG. 4, the real image processor 220 may include Global Positioning System (GPS) and may encode (step, 223) peripheral images of the user photographed through the cameras 216 with the position information of the user through GPS 222 and store it in the video repository 130 through a network module 40. In one embodiment, the real image processor 220 may separate and process an image of the camera of the left eye position of the user and an image of the camera at the right eye position of the user in an encoding process of the peripheral images. In one embodiment, the real image processor 220 may separate and store the peripheral image of the user in every predetermined time interval and predetermined space interval. The real image processor 220 may receive and decode (step, 224) the peripheral image of the user stored from the video repository 130 and may provide the decoded image to the mixed reality image processor 240 through the network module 40.

The virtual image processor 230 may receive and decode (step, 232) a virtual image generated directly or indirectly from the virtual reality generation device 120 through a network and provide it to the mixed reality image processor 240 through the network module 40.

The mixed reality image processor 240 may synthesizes the real image and the virtual image and display a mixed reality image on left and right display panels 242 and 243 at left and right sides of the user, respectively. In one embodiment, the mixed reality image processor 240 may sense (step, 60) a gaze movement of the user through a user brain wave and display a corresponding mixed reality image through the user right and left lenses 70 in the user gaze direction. In one embodiment, the mixed reality image processor 240 may receive a peripheral image at a past particular timing or a particular place stored in the video repository 130 and combine it with the virtual image at the corresponding timing or place to display a mixed reality image. The camera-based mixed reality glass device 110 may store and keep the past mixed reality image data of the user in the video repository 130 in real time and may provide it by loading to the user at any time through a specific reference.

Figure 5:
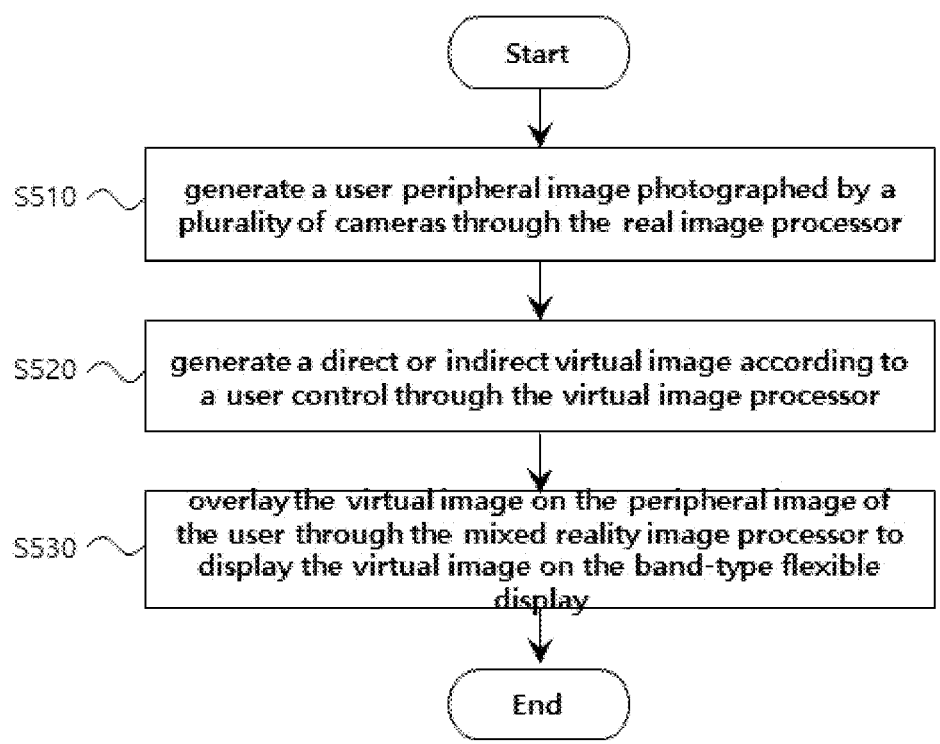
FIG. 5 is a flowchart illustrating a mixed reality display method through a camera-based mixed reality glass apparatus according to an embodiment.

FIG. 5 is a flowchart illustrating a mixed reality display method through a camera-based mixed reality glass apparatus according to an embodiment.

The camera-based mixed reality glass device 110 may generate a user peripheral image photographed by a plurality of cameras through the real image processor 220 (step, S510).

The camera-based mixed reality glass device 110 may generate a direct or indirect virtual image according to a user control through the virtual image processor 230 (step, S520).

The camera-based mixed reality glass device 110 may overlay the virtual image on the peripheral image of the user through the mixed reality image processor 240 to display the virtual image on the band-type flexible display.

Figure 6:
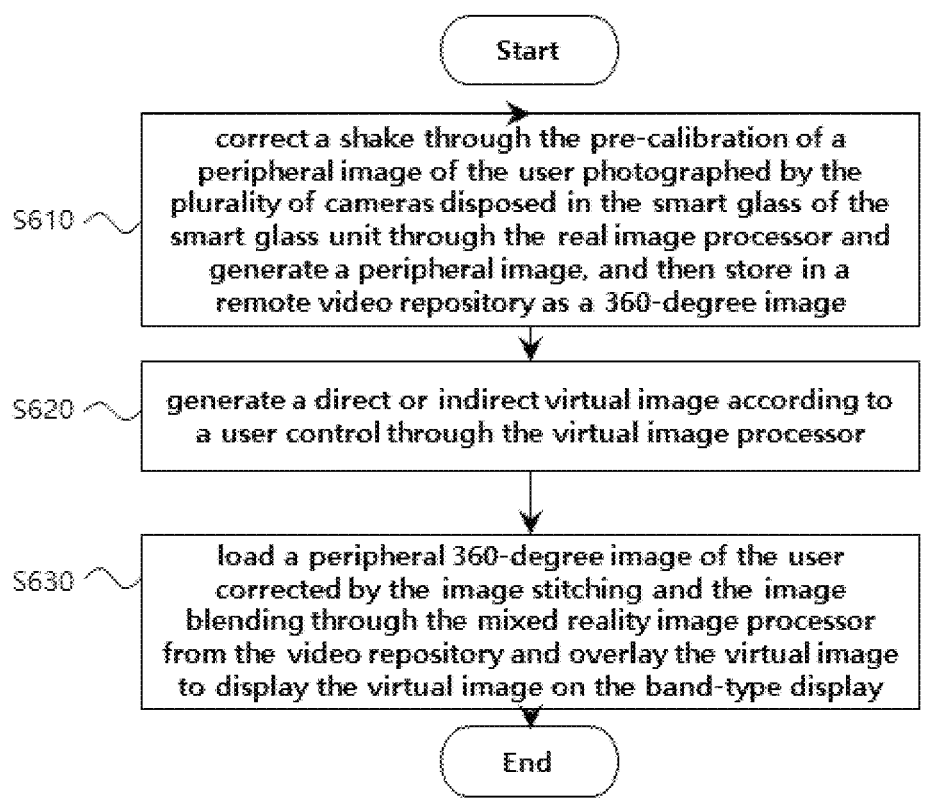
FIG. 6 is a flowchart illustrating a mixed reality display method through a camera-based mixed reality glass apparatus according to another embodiment.

FIG. 6 is a flowchart illustrating a mixed reality display method through a camera-based mixed reality glass apparatus according to another embodiment.

The camera-based mixed reality glass device 110 may correct a shake through the pre-calibration of a peripheral image of the user photographed by the plurality of cameras disposed in the smart glass of the smart glass unit 220 through the real image processor 210 and generate a peripheral image, and then store in a remote video repository as a 360-degree image (step, S610).

The camera-based mixed reality glass device 110 may generate a direct or indirect virtual image according to a user control through the virtual image processor 230 (step, S620).

The camera-based mixed reality glass apparatus 110 may load a peripheral 360-degree image of the user corrected by the image stitching and the image blending through the mixed reality image processor 240 from the video repository and overlay the virtual image to display the virtual image on the band-type display (step, S630).

FIG. 7 illustrates a configuration diagram (a) and a block diagram (b) showing a camera-based mixed reality glass apparatus according to another embodiment.

Figure 7A:
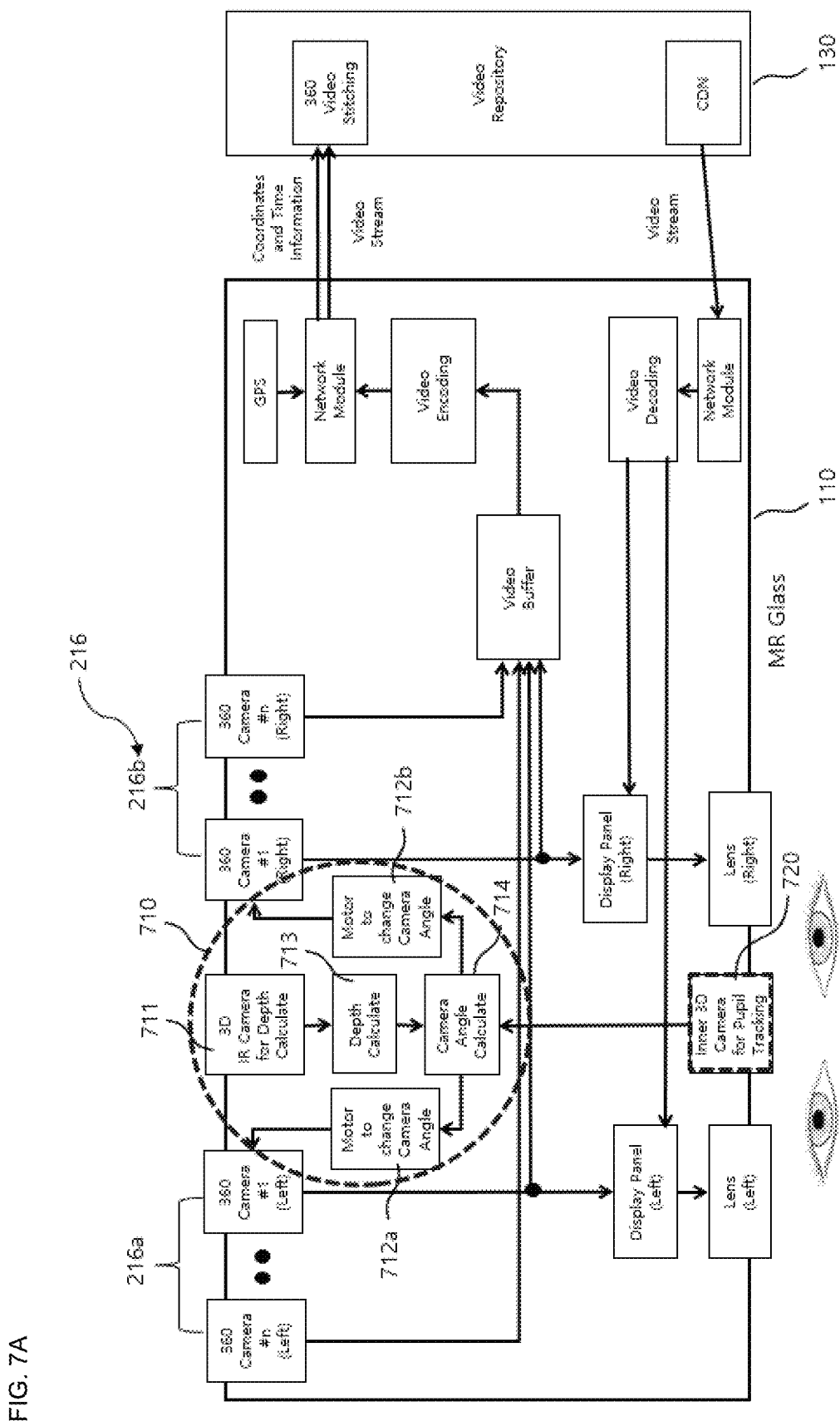
FIGS. 7A and 7B illustrate a configuration diagram (7A) and a block diagram (7B) showing a camera-based mixed reality glass apparatus according to another embodiment.
Figure 7B:
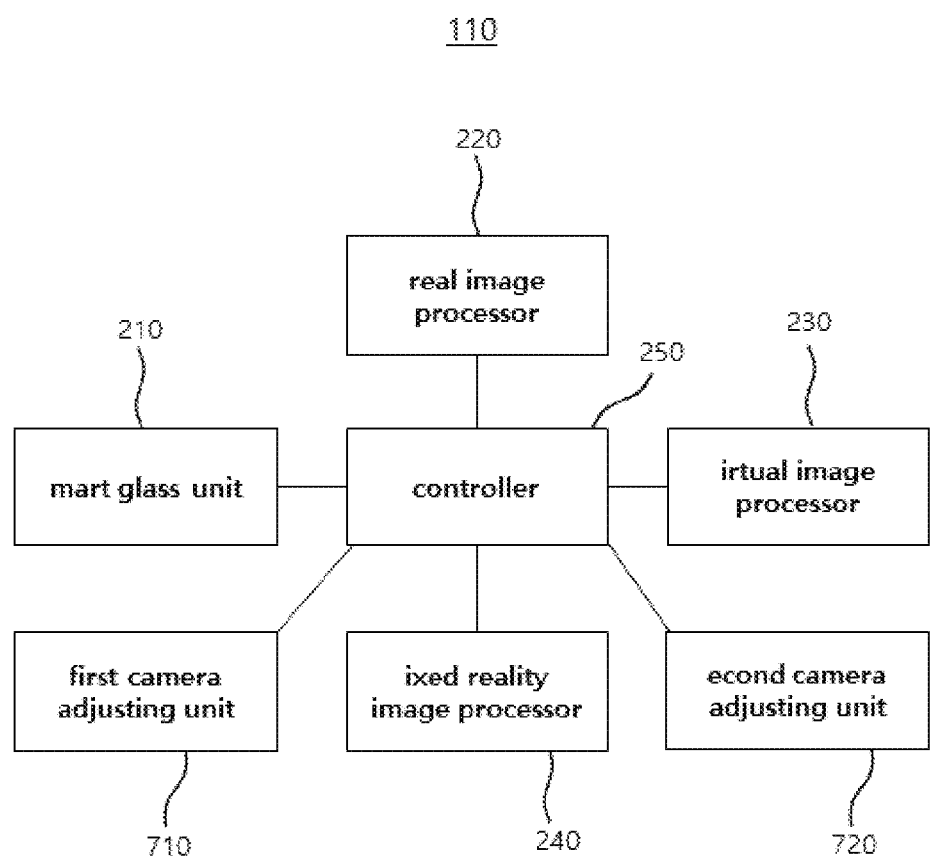

Referring to FIG. 7a, the camera-based mixed reality glass device 110 may include a first camera adjusting unit 710 and a second camera adjusting unit 720. Referring to FIG. 7b, the camera-based mixed reality glass device 110 may further include a smart glass unit 210, a real image processor 220, a virtual image processor 230, a mixed reality image processor 240 and a controller 250, and the first camera adjusting unit 710 and the second camera adjusting unit 720 connected to a plurality of cameras 216. More specifically, in FIG. 7, the camera-based mixed reality glass device 110 may further include the first camera adjusting unit 710 and the second camera adjusting unit 720 disposed between the plurality of cameras 216, and may adjust the plurality of cameras according to a distance to an object existing in the user gaze direction. The camera-based mixed reality glass apparatus 110 may adjust the angle of the camera 216 in real time to variably determine a focus provided according to the angle of the camera 216 determined based on an existing use in outdoor through the first camera adjusting unit 710 and the second camera adjusting unit 720. More specifically, the camera-based mixed reality glass apparatus 110 may calculate a distance from an object using the first camera adjusting unit 710 and the second camera adjusting unit 720 and calculate an angle of the front cameras 216 to adjust an optimal focus based on the calculated distance to move the front cameras 216 according to the corresponding angle, and accordingly, a focus of the object may be accurately adjusted and provide a real distance sense to the user. That is, the camera-based mixed reality glass apparatus 110 may provide a mixed reality image having an optimal focus and distance sense at any time to the user regardless of indoor and outdoor places using the first camera adjusting unit 710 and the second camera adjusting unit 720.

More specifically, the camera-based mixed reality glass device 110 may calculate a distance from an object in a gaze direction of the user through the first camera adjusting unit 710 disposed between left cameras 216a and right cameras 216b in the opposite direction of the user eye and the second camera adjusting unit 720 disposed between the band-type flexible displays 212 in the direction of the user eye and adjust angles of the plurality of cameras 216 based on the calculated distance, thereby providing the user with an accurate distance sense from the object. In one embodiment, the first camera adjusting unit 710 may detect an object in front of the user based on a direction toward a face of the user through a 3D IR camera 711 and adjust the camera 216, and the second camera adjusting unit 720 may detect an object in front of the user based on a direction that a pupil of the user faces through a pupil tracking camera 724 and adjust the camera 216. More specifically, the first camera adjusting unit 710 and the second camera adjusting unit 720 may be complementarily operated to adjust cameras to provide an optimal depth for the object to the user. The detailed description for each of the first camera adjusting unit 710 and the second camera adjusting unit 720 refer to FIG. 9 and FIG. 10.

Figure 8:
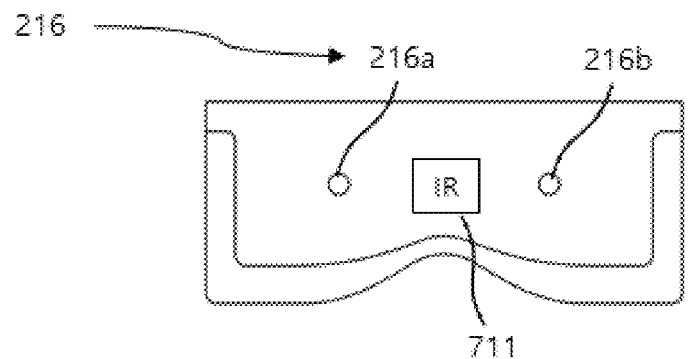
FIG. 8 is a configuration diagram illustrating a smart glass unit according to embodiments of FIGS. 7A and 7B.
Figure 8:
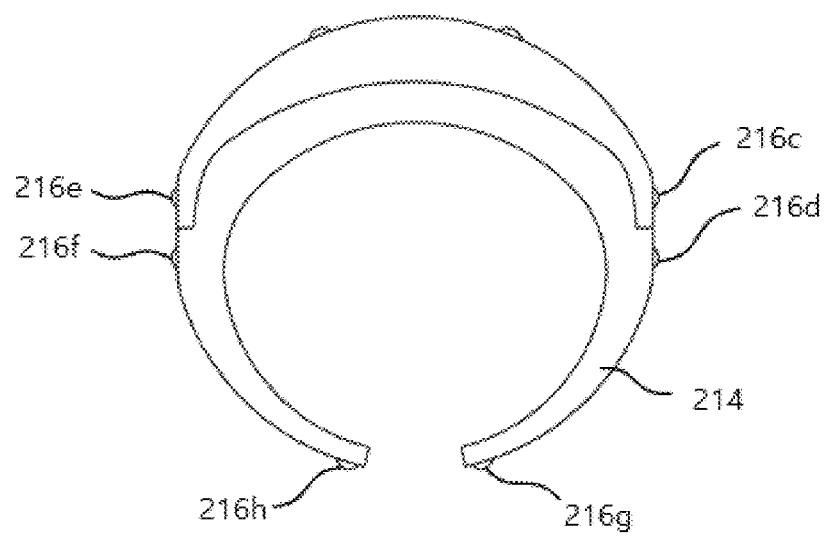
Figure 8:
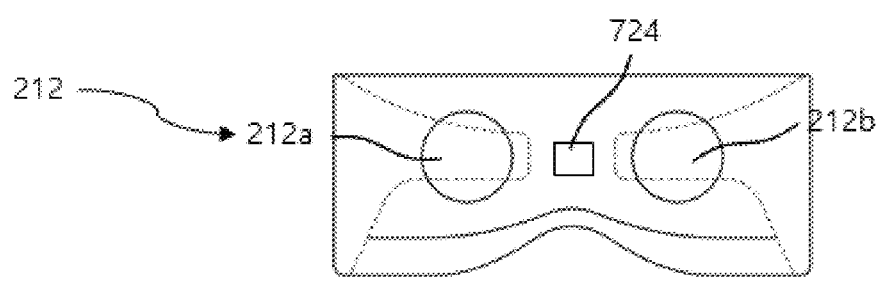

FIG. 8 is a configuration diagram illustrating a smart glass unit according to an embodiment of FIG. 7.

In FIG. 8, the smart glasses unit 210 may further include the 3D IR camera 711 and the pupil tracking camera 724. Here, 3D IR (Infrared) camera 711 may detect an object in a front face direction of the user wearing smart glasses through infrared rays. The 3D IR camera 711 may calculate a distance to a front object detected through infrared rays. Here, the pupil tracking camera 724 may sense a motion of a pupil of the user. In more detail, the pupil tracking camera 724 may detect a position of a pupil of the user moving based on a distance from an object in a gaze direction toward the pupil of the user.

In one embodiment, the smart glass unit 210 may arrange the 3D IR camera 711 between front cameras 216a and 216b located in front of the head engaging band 214. The smart glass unit 210 may arrange the pupil tracking camera 724 between the band-type flexible display 212 disposed in an inner user eye direction of the smart glass.

Figure 9:
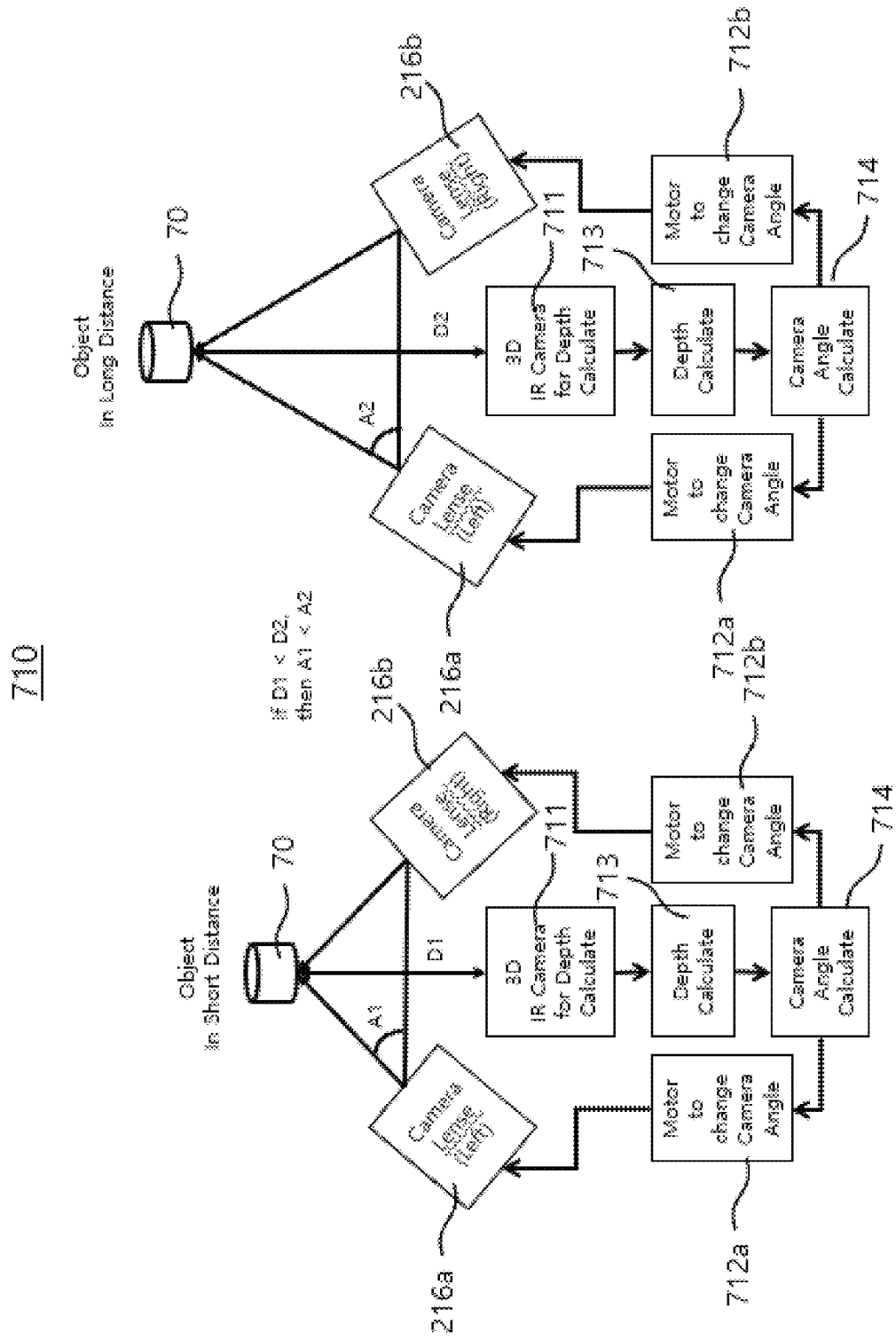
FIG. 9 is a configuration diagram illustrating the first camera adjusting unit of FIG. 7 according to an embodiment.

FIG. 9 is a configuration diagram illustrating the first camera adjusting unit of FIG. 7 according to an embodiment.

Referring to FIG. 9, the first camera adjusting unit 710 may include the 3D IR camera 711, a camera angle adjustment motor 712, a depth calculation module 713 and a camera angle calculation module 714.

In FIG. 9, the first camera adjusting unit 710 may detect a front object 70 facing a face of a user wearing the smart glass and adjust an angle of the front left and right cameras 216a and 216b. More specifically, the first camera adjusting unit 710 may calculate a distance by detecting a front object 70 through the 3D IR camera 711, calculate a depth through the depth calculation module 713 based on the calculated distance and calculate an angle of the camera providing an optimal focus to the object 70 through the angle calculation module 714 of the camera based on the calculated distance. Here, the depth may correspond to an area between a front surface and a rear surface of a subject (object) in focus when photographing with a camera. The first camera adjusting unit 710 may drive the camera angle adjusting motor 712 based on the calculated camera angle to adjust the angles of the front cameras 216a and 216b. For example, the first camera adjusting unit 710 may adjust angles of the front cameras 216a and 216b such that an internal angle of the camera inclined toward the object 70 becomes smaller A1 as a distance of the front object 70 is nearer and adjust angles of the front cameras 216a and 216b such that an internal angle of the camera inclined toward the object 70 becomes greater A2 as a distance of the front object 70 is farther. In one embodiment, the first camera adjusting unit 710 may also adjust angles of side and rear cameras according to the angle adjustment of the front cameras 216a and 216b. For example, the first camera adjusting unit 710 may variably adjust the angles of the side and rear cameras according to a predetermined criterion based on the degree of the angle adjustment of the front cameras 216a and 216b.

Figure 10:
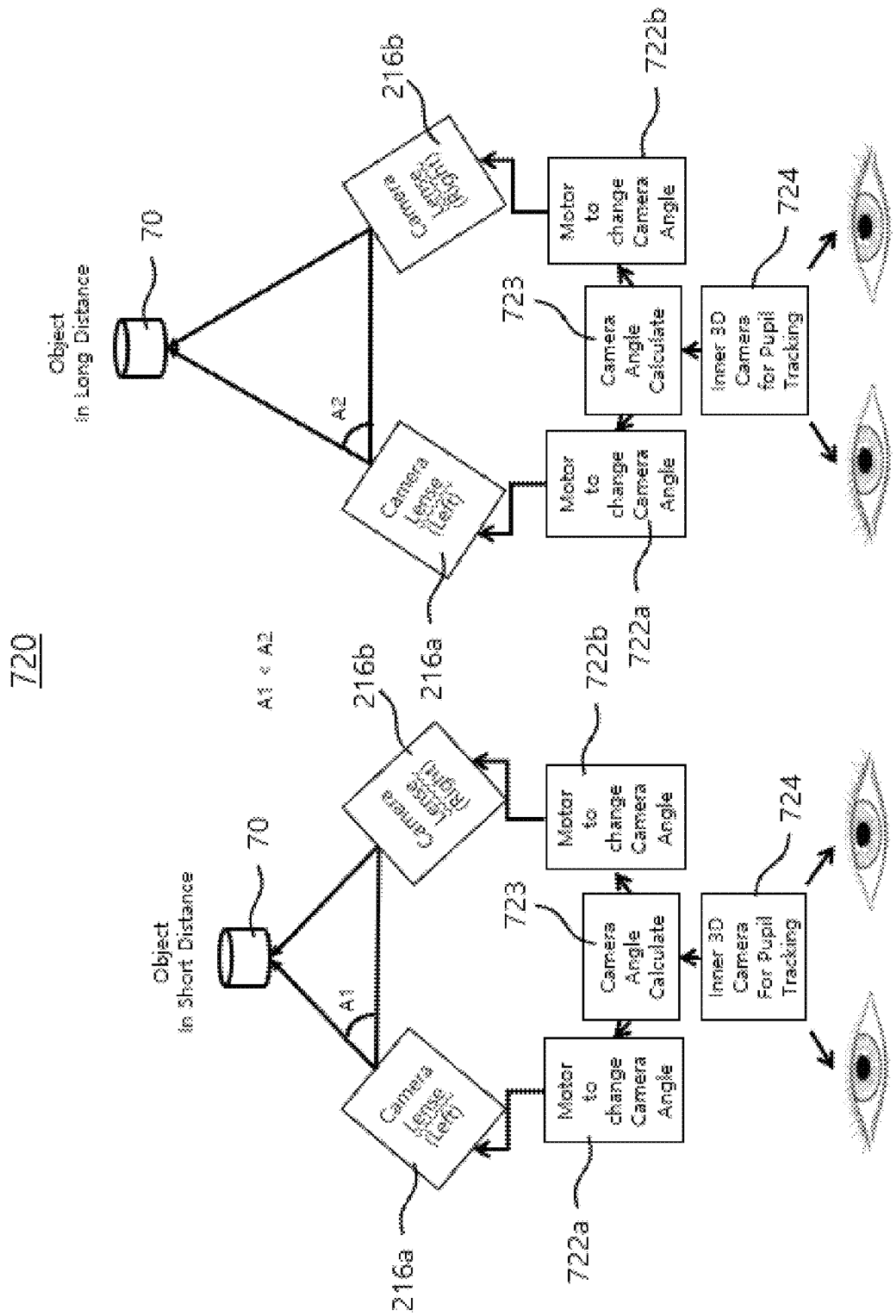
FIG. 10 is a configuration diagram illustrating the second camera adjusting unit of FIG. 7 according to an embodiment.

FIG. 10 is a configuration diagram illustrating the second camera adjusting unit of FIG. 7 according to an embodiment.

Referring to FIG. 10, the second camera adjusting unit 720 may include a camera angle adjustment motor 722, a camera angle calculation module 723 and the pupil tracking camera 724.

In FIG. 10, the second camera adjusting unit 720 may detect an object 70 in a gaze direction toward pupil of a user wearing the smart glasses and adjust angles of the front cameras 216a and 216b. More specifically, the second camera adjusting unit 720 may detect a direction of a pupil of the user looking an object through the pupil tracking camera 724 that tracks a movement of the pupil of the user and may calculate angles of the front cameras 216a and 216b through the camera angle calculation module 723 based on the detected direction, thereby adjusting the angle of the camera using the camera angle adjustment motor 722 based on the calculated angle. In one embodiment, in the case that a distance of the object 70 that the pupil of the user faces is close, the second camera adjusting unit 720 may narrow angles of the front cameras 216a and 216b through the camera angle calculation module 723 based on the direction of the detected pupil as the distance between the front and left pupil distances becomes closer. For example, the second camera adjusting unit 720 may form an internal angle A1 of the front cameras 216a and 216b inclined toward the object 70 when the object 70 is close to the pupil to be smaller than an internal angle A2 of the front cameras 216a and 216b inclined toward the object 70 when the object is far from the pupil.

Figure 11:
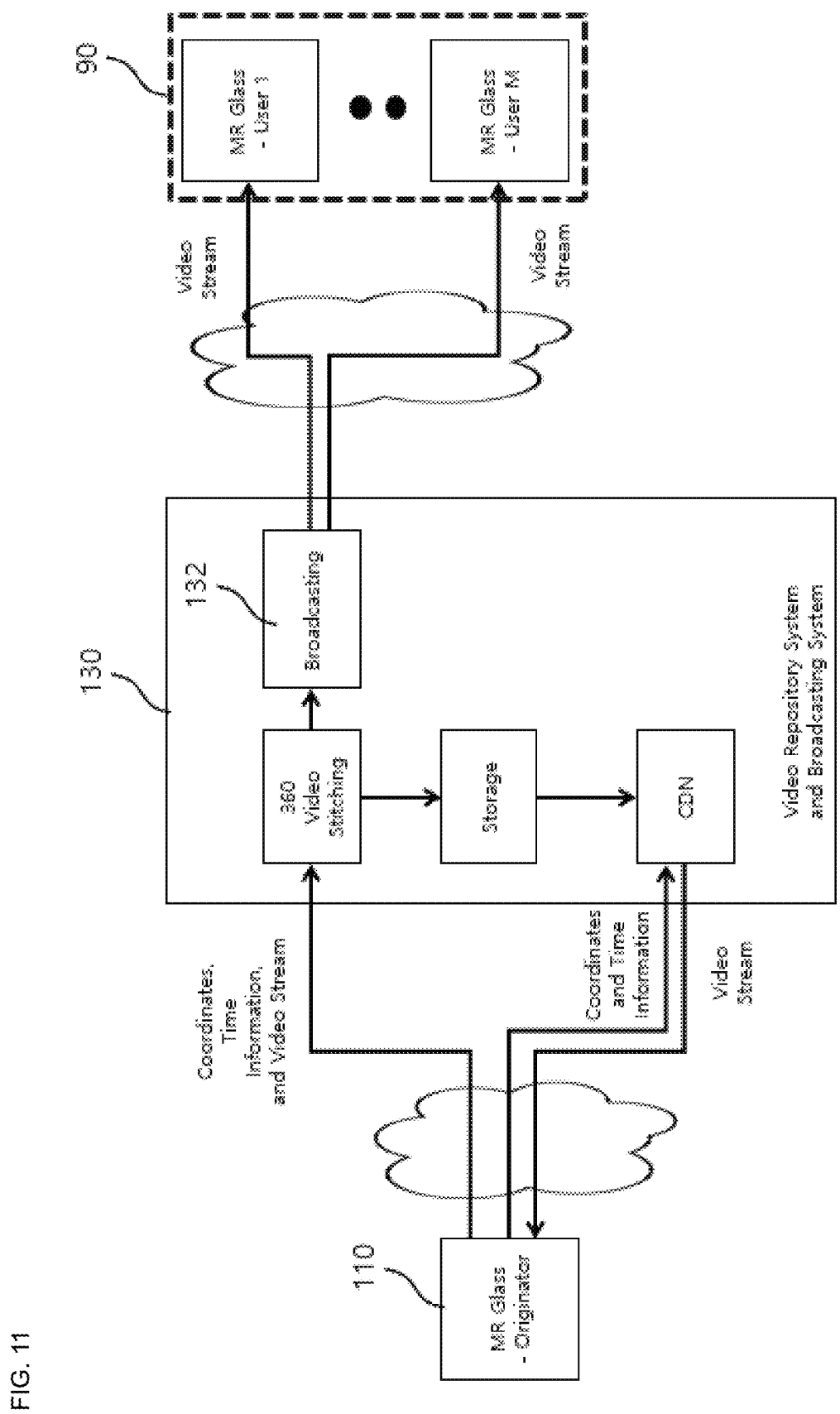
FIG. 11 is a diagram illustrating a mixed reality display system through a camera-based mixed reality glass apparatus according to another embodiment.

FIG. 11 is a diagram illustrating a mixed reality display system through a camera-based mixed reality glass apparatus according to another embodiment.

Referring to FIG. 11, the mixed reality display system may include a camera-based mixed reality glass device 110, a video repository 130, and a plurality of mixed reality smart glasses 90.

In FIG. 11, camera-based mixed reality glass device 110 may generate a user periphery image through a plurality of cameras and overlay a virtual image generated according to a user control on the periphery image, and accordingly, provide a mixed reality to the user. In one embodiment, the camera-based mixed reality glass device 110 may enable the user directly experience the generated mixed reality image and also store information about the experience time and place in the video repository 130 in real time and may stream it on a plurality of other identical mixed reality smart glasses 90 through broadcasting in real time. More specifically, the camera-based mixed reality glass apparatus 110 generates a mixed reality image and provides the same to a plurality of other identical mixed reality glass apparatuses 90 in real time, and simultaneously, stores the mixed reality image in the video repository 130, and accordingly, may share the immersive sense of the mixed reality image at a specific timing or place in real time to a user. For example, a scene to which a user currently immersed may be delivered to a plurality of other users, and a plurality of users may share the same immersive sense.

So far, the present disclosure is described with reference to a preferred embodiment, but it will be apparent to those skilled in the art that various modifications and variations may be made in the present disclosure without departing from the spirit or scope of the disclosure.

The disclosed technology may have the following effects. However, this does not mean that a specific embodiment should include all the following effects or include only the following effects, and accordingly, it should not be understood that the scope of the disclosed technology is limited thereby.

A camera-based mixed reality glass apparatus according to an embodiment of the present disclosure may include a smart glass interlinked with a video repository for providing mixed reality.

A camera-based mixed reality glass apparatus according to an embodiment of the present disclosure may generate and correct a surrounding image through a plurality of cameras attached to a smart glass to store in a video repository and display the generated mixed reality by overlaying a virtual image.

A camera-based mixed reality glass apparatus according to an embodiment of the present disclosure may interwork with a video repository to store and keep a mixed reality image, and then a user may load a desired image and enjoy the image through time or place information, and thereby providing high immersive experience to a user.

A camera-based mixed reality glass apparatus according to an embodiment of the present disclosure may provide optimal focus and distance sense to a user by adjusting an angle of camera in real time in a process of providing a mixed reality image.

DESCRIPTION OF REFERENCE NUMERALS

100: Mixed reality display system
110: Camera based mixed reality glass apparatus
120: Virtual reality generation device 130: video repository
210: Smart glass unit 212: band-type flexible display
214: Head engaging band 216: camera
220: Real image processor
230: Virtual image processor 240: mixed reality image processor
250: Controller
710: First camera adjusting unit 720: second camera adjusting unit
711. 3D IR camera 724: pupil tracking camera

What is claimed is:

1. A camera-based mixed reality glass apparatus, comprising:
a smart glass unit comprising: a band-type flexible display disposed in an eye direction of a user, a head engaging band mounting the band-type flexible display and formed along a head of the user and a plurality of cameras mounted on an opposite direction to the eye of the user in the band-type flexible display and disposed along the head of the user;
a real image processor for generating and transmitting a peripheral image of the user through the plurality of cameras;
a virtual image processor for generating a direct or indirect virtual image according to a control of the user; and
a mixed reality image processor for overlaying the virtual image on the peripheral image of the user and displaying the virtual image on the band-type flexible display,
wherein the real image processor determines a head direction center and a height center of the user through calibration before the generation of the peripheral image, corrects left and right rotational shake occurring during a movement of the user based on the head direction center and the height center, and stores the peripheral image in a video repository as a 360-degree image.

2. The camera-based mixed reality glass apparatus of claim 1, wherein the smart glass unit further includes at least one camera disposed at a front side and a rear side of the head engaging band, respectively, and configured to photograph a 360-degree image of the user as the peripheral image.

3. The camera-based mixed reality glass apparatus of claim 1, wherein the real image processor includes Global Positioning System (GPS) and provides information of a position and a time of the user determined through GPS together with the peripheral image of the user to a video repository through a network.

4. The camera-based mixed reality glass apparatus of claim 1, wherein the real image processor performs an image blending with respect to a boundary region where a plurality of images is overlapped, after the plurality of images received from a plurality of cameras are mechanically image-stitched in a process of correction regarding vertical and horizontal rotational shake.

5. The camera-based mixed reality glass apparatus of claim 4, wherein the mixed reality image processor overlays the virtual image on a 360-degree image corrected through the image stitching and the image blending, and wherein the virtual image includes a path guide for guiding a destination of the user.

6. The camera-based mixed reality glass apparatus of claim 1, further comprising a first camera adjusting unit configured to detect a distance from an object existing in a gaze direction of the user and adjust an angle of the plurality of cameras mechanically in real time based on the detected distance.

7. The camera-based mixed reality glass apparatus of claim 6, further comprising a second camera adjusting unit configured to detect a movement of a pupil of the user looking at the object and adjust an angle of the plurality of cameras mechanically based on the detected movement of the pupil.

8. The camera-based mixed reality glass apparatus of claim 1, wherein the camera-based mixed reality glass device stores the mixed reality image together with GPS information and time information in a video repository through a network in real time, and simultaneously, shares the mixed reality image by broadcasting in real time targeted to smart glasses of a plurality of users, and further, receives the mixed reality image for the GPS information and the time information from the video repository and provides it.

9. A camera-based mixed reality glass apparatus, comprising:
a smart glass unit comprising: a band-type flexible display disposed in an eye direction of a user, a head engaging band mounting the band-type flexible display and formed along a head of the user and a plurality of cameras mounted on an opposite direction to the eye of the user in the band-type flexible display and disposed along the head of the user;
a real image processor for generating and transmitting a peripheral image of the user through the plurality of cameras;
a virtual image processor for generating a direct or indirect virtual image according to a control of the user; and
a mixed reality image processor for overlaying the virtual image on the peripheral image of the user and displaying the virtual image on the band-type flexible display,
wherein the mixed reality image processor predicts a direction of the user gaze through a brain wave of the user and displays the mixed reality image in advance according to the direction of the user gaze.

10. A camera-based mixed reality glass display method, comprising:
determining a head direction center and a height center of a user through calibration;
generating a peripheral image of the user through a plurality of cameras disposed on a smart glass;
correcting left and right rotational shake of the peripheral image occurring during a movement of the user based on the head direction center and the height center;
storing the peripheral image in a video repository as a 360-degree image;
generating direct or indirect virtual image according to a control of the user; and overlaying the virtual image on the peripheral image and displaying the virtual image on a band-type flexible display.

* * * * *